Oct. 28, 1941.  J. L. KOZAK  2,260,812
INSPECTION PORT FOR SCREW CONVEYER CONNECTIONS
Filed March 19, 1941
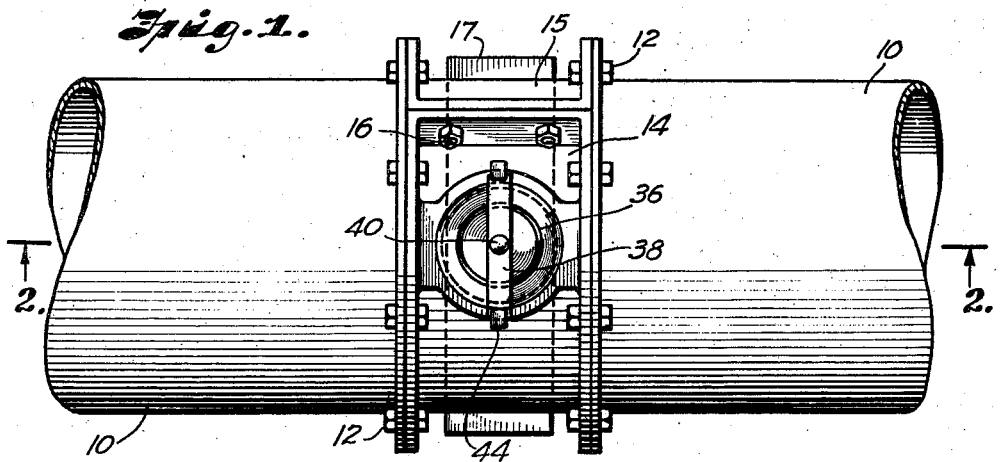
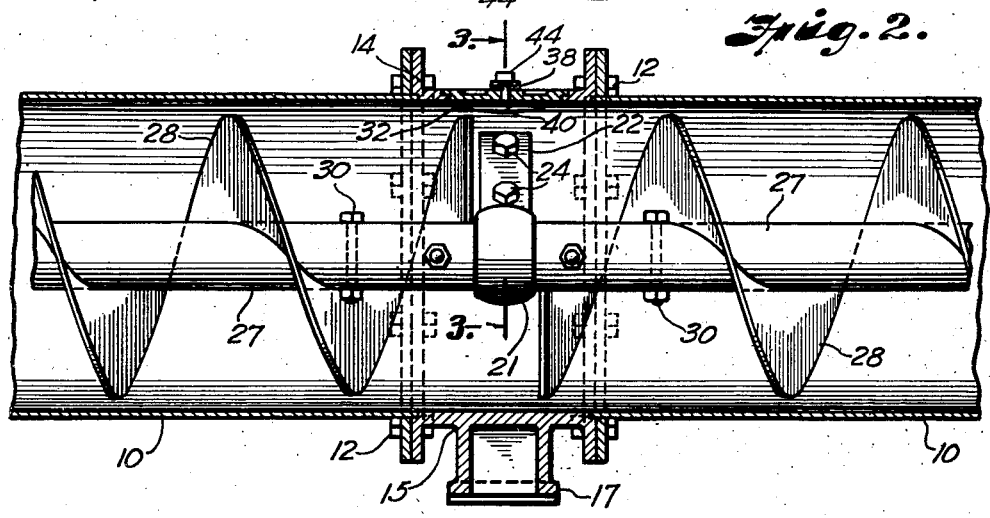
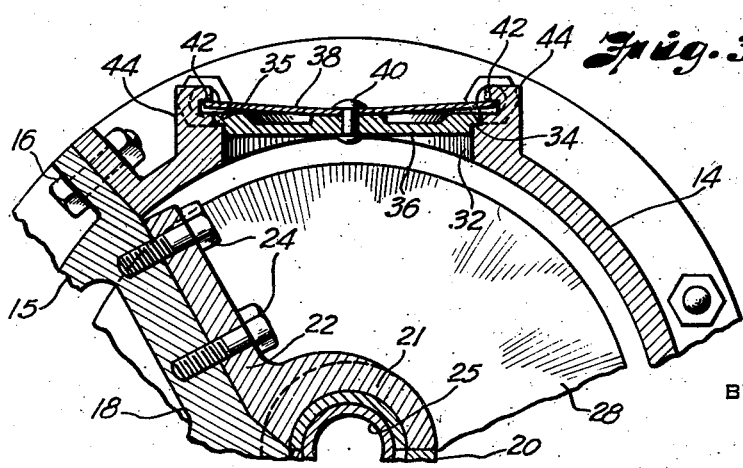
INVENTOR
J. L. Kozak
BY
ATTORNEY Patented Oct. 28, 1941

2,260,812

UNITED STATES PATENT OFFICE 2,260,812

INSPECTION PORT FOR SCREW CONVEYER CONNECTIONS

Joseph L. Kozak, Munster, Ind., assignor to Screw Conveyor Corporation, Hammond, Ind., a corporation of Illinois Application March 19, 1941, Serial No. 384,102

1 Claim. (Cl. 198—213)

The subject matter of the present invention relates to screw conveyer apparatus, with particular reference to helical or screw conveyer systems made up in multiple sections requiring coupling means and hanger or bearing structures at various points along the run of the conveyer.

Apparatus of this character, like any installation made up of multiple units or sections coupled together to form a continuous transporting or conveying system, of course requires intermittent inspection, repairs and service of various kinds for the proper maintenance of the equipment. This servicing and other attention makes it necessary to have access to the interior of the apparatus, particularly at the connections between the units or sections thereof, either for inspection of the equipment or for repairs or other purposes.

For facilitating the performance of such inspection and service, it is my object by means of the present improvement to provide a convenient and ready means of access to the interior of the apparatus, in the form of an inspection port or opening in efficient relation to the connections between the consecutive sections of the apparatus and having a practical closure device for effectively sealing the port or opening in the normal operation of the apparatus.

With the foregoing general object in view the invention will now be described by reference to the accompanying drawing illustrating one practical and efficient form of construction for effectively embodying the proposed improvement, after which those features and combinations deemed to be novel and patentable will be particularly set forth and claimed.

In the drawing:

Figure 1 is a plan view illustrating the connecting portion between two units of a screw conveyer installation, and equipped with an inspection port construction embodying the present invention;

Figure 2 is a longitudinal sectional view, representing a section taken on the line 2—2 of Figure 1; and Figure 3 is an enlarged detail sectional view, representing a section taken on the line 3—3 of Figure 2.

The present application features an improvement in sectional screw conveyer apparatus of the character particularly described in my copending application Serial No. 358,228 filed September 25, 1940. One outstanding characteristic of the conveyer construction there described was the provision of combination coupling and hanger bearing structures between the sections of the apparatus, so that at each joint between the sections or units of the apparatus a unitary assembly of connections comprises all the bearing structure for the conveyer as well as all the coupling means for connecting both the screw conveyer sections and also the conveyer trough or casing sections that are to be united at that particular joint of the apparatus. At these several joints of the installation, therefore, are concentrated practically all those portions of the equipment which need inspection from time to time to check up any source of operative trouble, as well as to afford access to the interior of the conveyer for making any minor repairs.

Referring now to the accompanying drawing in detail, two casing or housing sections 10 of a screw conveyer apparatus are illustrated as removably connected by means of bolts 12 to a combination coupling and hanger unit of the type described in my aforesaid application. This coupling and hanger unit comprises a split or sectional housing structure, the sections 14 and 15 thereof being bolted together as indicated at 16. The lower section 15 of the unit has a base or supporting part 17, and inside the unit said section 15 is formed with a web or hanger arm 18 terminating in a bearing portion 20 for cooperating with a cap bearing element 21. This cap bearing element has a stem portion 22 provided with screws for securing the same to the web or arm 18, and thus these hanger and bearing parts provide the necessary hanger structure for the shaft coupling member 25 which fits within the adjoining ends of the tubular shaft portions of the screw conveyer sections 28 and is secured to said shaft portions 27 by means of suitable bolts 30.

The upper portion of the section 14 of the hanger unit is constructed to provide an inspection port or opening 32 of appropriate diameter and formed with an annular outer seat 34 for the support of a flange 35 on the outer margin of a closure disk member 36 which is adapted to fit inside said opening 32—see Figure 3.

For securing the disk 36 in its closure relation to said opening 32, and with its flanged edge 35 seated upon said ledge or shoulder 34, a slightly curved leaf spring element 38 is provided with a rivet 40 for attaching the same to the center of said disk, said spring being of sufficient length for adapting the ends thereof to be sprung and rotated into latching engagement with a pair of notches or recesses formed in a pair of lugs 44 projecting upward from opposite sides of the port or opening 32, all as clearly illustrated in Figure 3 of the drawing.

Bearing in mind that this improved feature of the inspection port is provided at each of the several joints between the sections of the conveyer apparatus, it is quite apparent that this means of obtaining ready access for periodic inspection of the connections, which are all located at those points, affords a direct and very convenient means of examining those connections and locating any defect or trouble and remedying the same, such as the tightening of any of the coupling bolts which sometimes work loose, particularly when intermittent loading conditions are incurred in the operation of the conveyer.

The port openings also provide a means for observing the flow and action of the material being conveyed, so that in case of a break-down in the operation such inspection enables the operator to trace the trouble quickly to the points between which the operation is being affected.

There are also some operations in which drying means (such as steam-jacketed housings) are used, as for drying the material being handled, and which sometimes makes it necessary to vent the conveyer passage to draw off the vapor and inject dry air into said passage,—a procedure which is of course readily accomplished through the medium of the inspection ports herein provided.

Still another special advantage which is contemplated as one of the important benefits to be gained from the use of the inspection port feature is in connection with its use as a means for observing the flow of the material, and of the quantity of the material in the conveyer casing at any given time. This is a matter of importance in connection with the handling of different kinds of material in successive operations of the apparatus. Since there is always a clearance between the conveyer 28 and the trough or housing 10, the stopping of the conveyer operation will ordinarily leave some of the material along the bottom of the trough throughout the length of the conveyer, which is of course objectionable if the next operation is to handle a different material. This may be avoided, however, by suitably speeding up the operation of the conveyer at the finish, to sweep out all the rest of the material,—observing through the inspection ports when such a result has been reached, before finally stopping the operation of the conveyer.

It will therefore be seen that by means of the construction herein described and illustrated, very desirable features of improvement are provided for fulfilling the several objects of the invention, and the novel points thereof which I deem to be of patentable merit will be duly defined in the following claim.

Having described my invention, what I claim and desire to secure by Letters-Patent is:

A combination coupling and hanger unit for screw conveyer apparatus made up of multiple sections, said unit comprising a housing structure provided with coupling means for removably connecting adjoining ends of said multiple sections and including disconnectible shaft connections for coupling adjoining ends of the interior screw conveyer sections, said unit also having bearings for the coupled ends of said conveyer sections, the top of said housing structure being provided with an opening for facilitating inspection of the interior of the unit and obtaining access for servicing said connections and coupling means, said housing structure having a pair of notched lugs projecting upward at opposite sides of said opening, a removable closure disk fitting said opening and formed with a marginal flange for seating engagement with the outer margin of the opening, and a curved leaf spring having its intermediate portion secured to the outer face of said disk and leaving the outer ends of the spring free for moving into latching engagement with the notched portions of said lugs.

JOSEPH L. KOZAK.